US007001943B2

(12) United States Patent
Yuan et al.

(10) Patent No.: US 7,001,943 B2
(45) Date of Patent: Feb. 21, 2006

(54) CHIP RESISTANT PRIMER COMPOSITION USEFUL FOR PRODUCING TWO-TONE FINISHES

(75) Inventors: San C. Yuan, Commerce Township, MI (US); Mary Ann Haslett, Lake Orion, MI (US)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/688,035

(22) Filed: Oct. 17, 2003

(65) Prior Publication Data

US 2005/0085569 A1   Apr. 21, 2005

(51) Int. Cl.
*C08L 67/00* (2006.01)
(52) U.S. Cl. .................... 524/423; 524/413; 524/442; 524/445; 524/539; 525/444
(58) Field of Classification Search ................ 524/423, 524/413, 442, 445, 539; 525/444
See application file for complete search history.

(56) References Cited

U.S. PATENT DOCUMENTS

| | | | |
|---|---|---|---|
| 4,238,583 A * | 12/1980 | Tobias et al. ............... | 525/443 |
| 4,450,200 A * | 5/1984 | Iwato et al. ................ | 428/323 |
| 4,614,683 A | 9/1986 | Barsotti | |
| 4,855,359 A | 8/1989 | Ryntz et al. | |
| 5,468,791 A * | 11/1995 | Yuan .......................... | 524/108 |
| 5,549,929 A * | 8/1996 | Scheibelhoffer et al. .... | 427/282 |
| 5,635,251 A | 6/1997 | Oda et al. | |
| 6,863,929 B1 | 3/2005 | Watanabe et al. | |
| 2003/0059617 A1 | 3/2003 | Kojima et al. | |
| 2003/0158321 A1 | 8/2003 | Watanabe et al. | |

FOREIGN PATENT DOCUMENTS

| | | |
|---|---|---|
| JP | 63-143973 A | 6/1988 |
| JP | 1994254482 A | 9/1994 |
| JP | 1994256714 A | 9/1994 |
| JP | 10-130571 * | 5/1998 |
| JP | 2002-249709 A | 9/2002 |
| WO | WO 2005/037941 A2 | 4/2005 |

OTHER PUBLICATIONS

Takakazu Yamane, Tsutomu Shigenaga, Teruo Kanda, Yusuke Kamesako, Toshifumi Ogasahara, Masaki Kake and Masakazu Watanabe, "Development of Eco-Friendly Three-Layer Wet Paint System", SAE International, Jan. 2004, pp. 1-5.

* cited by examiner

*Primary Examiner*—Ana Woodward
(74) *Attorney, Agent, or Firm*—Steven C. Benjamin

(57) ABSTRACT

A curable coating composition with holdout capability, and methods of use thereof, useful in providing a chip resistant two-tone finish in a reduced number of coating steps and curing cycles, which contains a hydroxyl-functional polyester resin, or a plurality of hydroxyl-functional polyester resins, with an average hydroxyl functionality of at least 2.1, a hydroxyl number of 75 to 400 mg KOH/g, a number average molecular weight of 1,000 to 10,000, an acid number of 1 to 30; a curing agent; and, a barium sulfate pigment This invention is also directed to method for coating a substrate with the above coating composition. In one embodiment, the method comprises (1) applying a holdout capable chip resistant primer coating composition of the forgoing character to an accent area of a electrodeposition primed substrate, (2) applying a primer surfacer coating composition to an adjacent non-accent area of the substrate, (3) applying an accent color basecoating composition wet-on-wet to the chip resistant primer coating composition in the accent area, (4) curing the composite coated substrate in a first bake, (5) covering the accent area with a protective membrane, (6) applying a main color basecoating composition over the unmasked area, (7) removing the protective membrane from the accent area, (8) applying a clear coating composition wet-on-wet to all faces of the substrate, and then (9) curing the composite two-toned coated substrate in a second bake, is also claimed. Further claimed is a substrate coated by the aforementioned coating and methods.

28 Claims, 2 Drawing Sheets

Conventional Two Tone Paint Process

3 Wet Coat Integrated Two Tone Paint Process

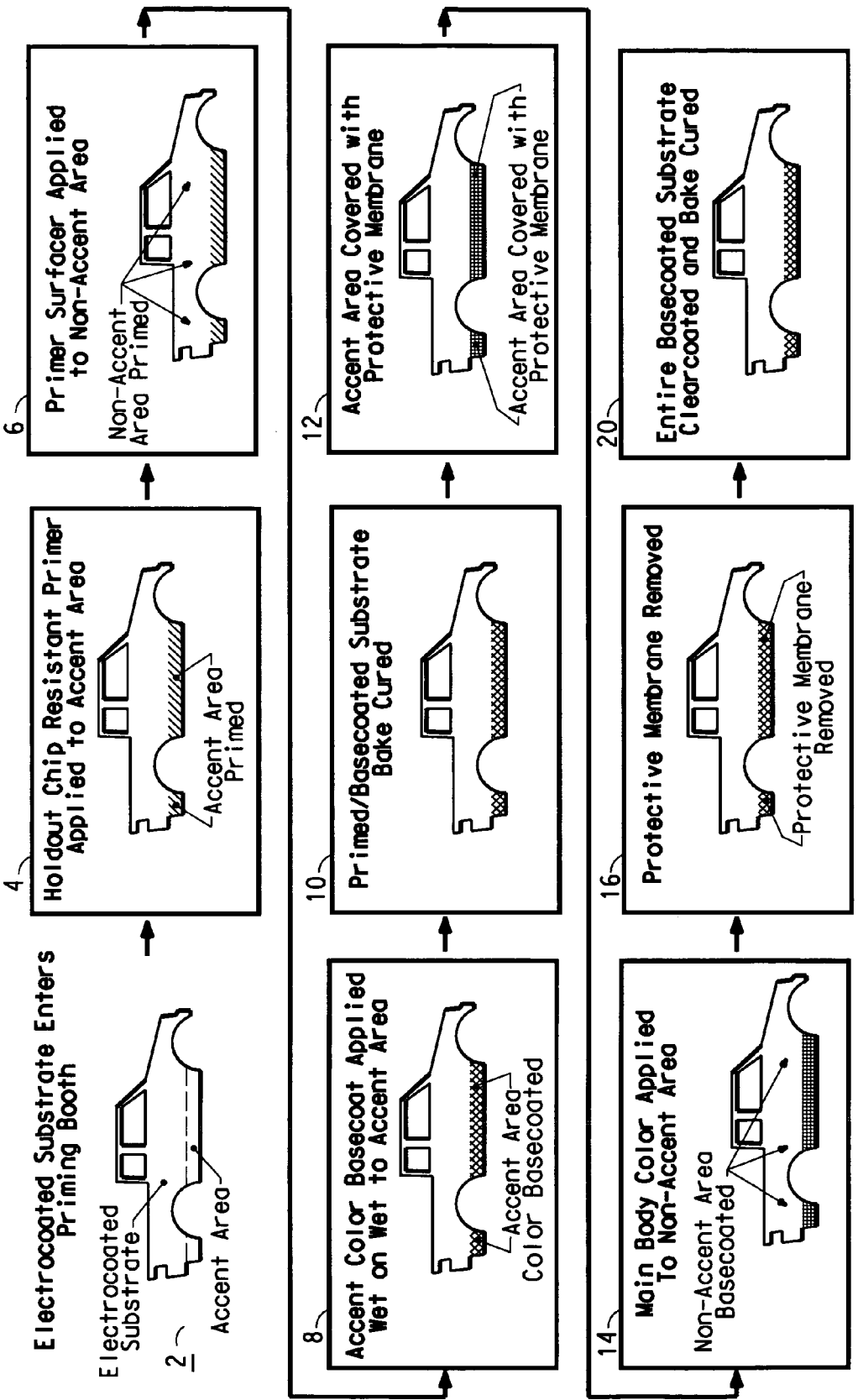

CHIP RESISTANT PRIMER COMPOSITION USEFUL FOR PRODUCING TWO-TONE FINISHES

BACKGROUND OF THE INVENTION

This invention relates to a coating composition particularly useful for producing a multiple colored, two-tone, chip resistant finish on a substrate such as an automobile or truck requiring only two curing cycles.

Transportation vehicles, such as automobile and truck bodies, are treated with multiple layers of coatings which enhance the appearance of the vehicle and also provide protection from corrosion, scratch, chipping, ultraviolet light, acid rain and other environmental conditions. Basecoat/clearcoat finishes for automobiles and trucks have been commonly used over the past two decades, in a "wet-on-wet" application, i.e., the clear coat is applied before the base coat is completely cured. In typical fashion, the basecoat/clearcoat finish is typically applied over a previously cured primer surfacer coated substrate. It is also common to apply a special chip resistant primer in the low body areas of automobile and truck bodies, during the primer surfacer application stage.

The desire for even more unique and attractive color styling has led the automobile and truck Original Equipment Manufacturers (OEM) produce vehicles with multiple colored, or "two-toned," finishes. A typical procedure used to produce a chip resistant "two-tone" finished vehicle substrate involves the following:

I) Application of a lower body chip resistant primer over an electrocoated vehicle substrate;
II) Application of a primer surfacer to the entire substrate;
III) Bake curing the prime coated substrate;
IV) Applying a main non-accent color basecoat to the vehicle substrate;
V) Applying clearcoat over the main color basecoat;
VI) Bake curing and covering with a protective membrane, the upper body main color basecoat/clearcoat finish area of the substrate;
VII) Applying accent color in accent area
VIII) Applying accent clear in accent area
IX) Bake curing the accent basecoat/clearcoat finish, and removing the protective membrane.

Accordingly, producing a chip resistant two-tone finished vehicle substrate typically involves three bake curing cycles and six coating stages, including passing the vehicle substrate through the basecoat/clearcoat finishing stages on two separate occasions. Several practical disadvantages arise with this typical procedure. These include two separate clearcoating steps, one additional bake curing cycle, and most notably, the requirement to pass the vehicle substrate through the basecoat/clearcoat finishing stages on two separate occasions tying up the vehicle assembly line and producing a production bottleneck. This last disadvantage is time consuming, energy demanding, and not cost effective.

Therefore, there is a need for coating compositions, which provide multiple colored two-tone finishes in a minimum number of coating layers and bake curing cycles.

SUMMARY OF THE INVENTION

The claimed invention is directed to coating materials, in particular, novel chip resistant coating compositions, useful in producing multiple colored, two tone, chip resistant finishes in a wet-on-wet 3 integrated coat single pass fashion through standard automotive coating application lines. The multiple colored two tone finish is produced while reducing the number of coating steps and curing cycles, and in the same instance, meeting current low overall solvent emission and chip resistance requirements.

The chip resistant primer coating composition comprises a plurality of hydroxyl-functional polyester resins with high and low glass transition temperatures, an average hydroxyl functionality of at least 2.1, a hydroxyl number of 75 to 400 mg KOH/g, a number average molecular weight of 1,000 to 10,000, an acid number of 1 to 30; a curing agent; and a barium sulfate pigment.

This invention is also directed to method for coating a substrate with the above coating composition. In one embodiment, the method comprises (1) applying a chip resistant primer coating composition with holdout capability of the forgoing character to an accent area of a electrodeposition primed substrate, (2) applying a primer surfacer coating composition to an adjacent non-accent area of the substrate, (3) applying an accent color basecoating composition wet-on-wet to the chip resistant primer coating composition in the accent area, (4) curing the composite coated substrate from step in a first bake, (5) covering the accent area with a protective membrane, (6) applying a main color basecoating composition over the unmasked area, (7) removing the protective membrane from the accent area, (8) applying a clear coating composition wet-on-wet to all faces of the substrate, and then (9) curing the composite two-toned coated substrate in a second bake.

In yet another method embodiment, the primer used in steps (1) and (2) above are the same primer coating composition, further reducing the number of coating steps to produce a two tone finish.

The method of this invention can be operated in a single pass continuous in-line paint application process or in stationary batch process, at a vehicle assembly plant.

A coated substrate having a two-tone composite coating prepared according to the present method also forms part of this invention.

BRIEF DESCRIPTION OF THE DRAWINGS

FIG. 3 is a graphic illustration of a process for applying a two-tone finish on a vehicle substrate featuring the use of an embodiment of present invention.

DETAILED DESCRIPTION OF THE INVENTION

Figure 2:
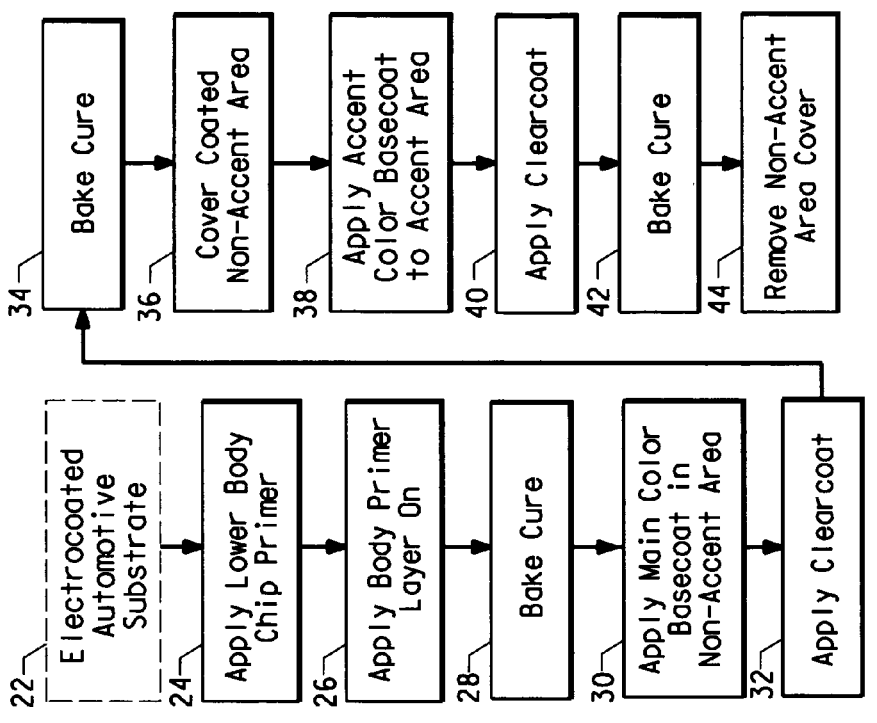
FIG. 2 is a general flow diagram of a conventional two-tone coating method.

The present invention is directed to a curable coating composition. A chip resistant primer coating composition with holdout capability based upon the present invention is useful in providing a chip resistant two-tone layering system. Such a primer composition comprises a plurality of hydroxyl-functional polyester resins, a curing agent, and a barium sulfate pigment.

The term "holdout capable" means a recently applied uncured initial coating possesses intermixing resistance and maintains a substantial interfacial boundary when a secondary coating layer, or plurality of coatings layers, are subsequently applied over the initial coating layer. This type of multiple coating technique without curing between layers is commonly referred to as "wet-on-wet" when two wet coats are used, or "wet-on-wet-on-wet" for three wet coating layers.

By "two-tone" it is meant that a vehicle finish has two distinctly different colors. A first accent color which covers a minor portion of the vehicle's outer substrate, usually in the lower or middle vertical area (such as the door, fender, quarter panel), and a second main body color that covers the remaining major portion of the vehicle's outer substrate.

The terminology "protective membrane" is defined as a pliable film which possesses the characteristics to cover and shield a first cured coating layer from exposure to subsequently applied second coating layer, thus maintaining the integrity of the first cured coating layer. The protective membrane may be secured in place by any practical means, such as tape, or adhesive. Such protective membranes are widely available in the marketplace. Vector Technologies of Grand Blanc, Mich., supplies a particularly useful protective membrane that has an adhesive deposited on the membrane, which is self-adherent and does not require tape to secure the membrane.

As used herein, "high" glass transition (Tg) temperatures mean Tg's above −15° C. "Low" Tg's are generally considered those at −15° C. or below. The preferred embodiments based upon the coating compositions of the present invention include a high Tg hydroxyl-functional polyester resin with a Tg preferably from about 40 to −15° C., more preferably from 10 to −10° C., and a second low Tg hydroxyl-functional polyester resin with a Tg preferably from about −15 to −60° C., more preferably from −20 to −40° C. Glass transition temperatures as used herein are determined by dynamic mechanical analysis.

The present invention is based upon the unexpected discovery that blending a polyester with a low glass transition temperature with another polyester resin with a high glass transition temperature, along with barium sulfate and crosslinker components, provides an excellent holdout capable coating composition. Such a composition is useful when another coating, or plurality of coatings, is directly applied in a wet-on-wet or wet-on-wet-on-wet scenario. Further, a coating composition based upon the aforementioned discovery imparts improved chip resistant properties into a finish. As such, the coating composition is particularly useful as a vehicle body holdout chip resistant primer surfacer.

By replacing the conventional chip resistant urethane primer with a chip resistant primer composition capable of wet-on-wet, or wet-on-wet-on-wet, application with a basecoat and/or another primer surfacer, the number of steps and curing cycles in the conventional two-tone painting process can be reduced, without sacrificing chip resistant performance in the two-tone accent area. A primer coating composition based upon the present invention makes possible the elimination of the chip resistant urethane while reducing the number of coating and baking cycles to achieve a two-tone finish.

The present invention is also directed to a method for forming a multi-colored two-tone composite finish on a variety of substrates, especially on portions of automobile and truck bodies and parts thereof, utilizing a coating composition based upon the present invention. The process of the present invention can be run in a batch or continuous process. Ideally, it is designed to be run in existing primer surfacer/basecoat/clearcoat painting facilities, such as continuous in-line or modular batch facilities, located at an automotive assembly plant without the need for double processing of a vehicle through the paint line or the need to extend the painting time.

Further, the invention is directed to a coated substrate. The coated substrate is prepared according to the methods described, using the curable coating composition of the invention. The coated substrate may be, for example, a transportation vehicle substrate such as an automotive, truck, airplane, or vessel.

The film-forming portion of the present curable coating composition, comprising the polymeric and other film-forming components, is referred to as the "binder" or "binder solids." The "binder" or "binder solids" are dissolved, emulsified or otherwise dispersed in an organic solvent or liquid carrier.

The binder content of the present coating composition ranges from about 30 to 85% by weight of total composition weight, and correspondingly may contain about 15 to 70% by weight of a liquid carrier which generally is an organic solvent for the binder. The coating composition contains pigments in a pigment to binder weight ratio of about 10/100 to 200/100.

As a part of the binder solids, the coating composition includes in the range of from 20 percent to 90 percent, preferably in the range of from 50 percent to 85 percent, and more preferably in the range of from of 60 percent to 80 percent of a plurality of high Tg and low Tg hydroxyl-functional polyester resins, the percentages being in weight percentages based on the total weight of binder solids.

The polyester resins are the esterification product of an alkylene glycol, a triol, a polyol, and a dicarboxylic acid or anhydride or an ester of a dicarboxylic acid. The polyesters have a number average molecular weight from about 1000 to 10,000, preferably about 1500 to 5000, a hydroxyl number from about 75 to 400 mg KOH/g, preferably about 100 to 300 polyester, an acid number from about 1 to 30, preferably about 2 to 15, and a average hydroxy functionality of at least 2.1 per molecule. As referenced herein, molecular weight is determined by gel permeation chromatography using polystyrene as the standard.

Typical alkylene glycols or diols that can be used to form the polyesters are trimethylol pentane diol, ethylene glycol, propylene glycol, butylene glycol, neopentyl glycol, 1,6 hexane diol, diethylene glycol, cyclohexanediol, cyclohexanedimethanol, trimethylpentanediol, ethylbutylpropanediol, and the like. Typical triols that can be used are trimethylol propane and trimethylol ethane. Pentaerythritol, ditrimethylolpropane, glycerol, dipentaerythritol, and polyalkylene glycol, such as polyethylene glycol and polypropylene glycol, also can be used.

Aromatic dicarboxylic acids and their anhydrides that can be used are phthalic acid, phthalic anhydride, isophthalic acid, teraphthalic acid and the like.

Hydrogenated aromatic dicarboxylic acids or their anhydrides that can be used are hexahydrophthalic acid or anhydride, tetrahydrophthalic acid or anhydride.

Typical saturated aliphatic dicarboxylic acids or esters thereof that can be used are malonic acid, succinic acid, glutaric acid, adipic acid, pimelic acid, azelaic acid, sebacic acid, 1,4 cyclohexane dicarboxylic acid, 1,3 cyclohexane dicarboxylic acid, dimethyl 1,4 cyclohexane dicarboxylate, 1,12-dodecanedioic acid, and the like. Adipic acid is preferred.

Examples of suitable cycloaliphatic polycarboxylic acids are tetrahydrophthalic acid (or anhydride), hexahydrophthalic acid (or anhydride), 1,2-cyclohexanedicarboxylic acid (or anhydride), 1,3-cyclohexanedicarboxylic acid, 1,4- cyclohexanedicarboxylic acid, 4-methylhexahydrophthalic acid (or anhydride), endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid and combinations thereof. The cycloaliphatic polycarboxylic acids can be used not only in their cis but also in their trans form and as a mixture of both these forms. The preferred cycloaliphatic polycarboxylic acids are tetrahydrophthalic acid (or anhydride), hexahydrophthalic acid (or anhydride), 1,2-cyclohexanedicarboxylic acid (or anhydride), 1,4-cyclohexanedicarboxylic acid and 4-methylhexahydrophthalic acid (or anhydride).

The polyesters are prepared by a conventional esterification process in which the components of the polyester are charged into a polymerization vessel with solvent and preferably with an esterification catalyst and heated to about 100° to 300° C. for about 2–10 hours. Water is removed as it is formed in the process. Typical catalysts that can be used to form the polyester are organo tin compounds such as dibutyl tin dilaurate, dibutyl tin oxide and the like. Alkoxy titanates also are suitable catalysts.

The following are preferred polyesters that can be used in a primer coating composition based on the present invention:

In a preferred embodiment, the low Tg polyester comprises from about 15–25% by weight neopentyl glycol, 10–15% by weight trimethylol propane, 5–10% by weight 1,6 hexane diol, 10–15% isophthalic acid, 10–15% adipic acid, 15–25% by weight 1,12-dodecanedioic acid, and 5–15% by weight phthalic anhydride.

In a preferred embodiment, the high Tg polyester comprises from about 5–15% by weight trimethylol propane, 30–45% by weight neopentyl glycol, 5–15% by weight adipic acid, 20–30% by weight phthalic anhydride, and 10–20% by weight isophthalic acid.

The coating composition includes a monomeric or polymeric alkylated melamine formaldehyde curing agents, or any mixtures thereof, as part of the binder solids. The melamine-curing agent used can be partially or fully alkylated with an alkanol having 1–4 carbon atoms. Preferred are monomeric alkylated melamine formaldehyde resin crosslinking agents.

The melamine formaldehyde resin, or mixture of resins, is incorporated in the range from about 10% to 50%, preferably in the range of from 15% to 40%, more preferably in the range of from of 20% to 35%, based on the total weight of binder solids.

In addition to binder solids constituents described above, other film forming and/or crosslinking solution polymers can optionally be included in the binder of the composition of the present invention. Examples include conventionally known acrylics, cellulosics, aminoplasts, urethanes, polyesters, polyisocyanates, epoxy resins, or any mixtures thereof. One preferred optional film-forming polymer is a polyol, for example, an acrylic polyol solution polymer of polymerized monomers. Such monomers can include any of the aforementioned alkyl acrylates and/or methacrylates and, in addition, hydroxy alkyl acrylates or methacrylates. The polyol polymer preferably has a hydroxyl number of about 50–200 and a weight average molecular weight of about 1,000–200,000 and preferably about 1,000–20,000.

Optionally, up to about 15% by weight, based on the weight of the binder, of an epoxy resin can be added to the primer to improve adhesion of the primer to an electrodeposited substrate that is applied to the steel or metal substrate typically used for autos and trucks. Useful are those epoxy resins disclosed in U.S. Pat. No. 5,468,791, incorporated herein by reference. Other useful epoxy resins may be readily known to those with skill in the art. One particularly preferred epoxy resin is EPON® 828 available from Resolution Performance Products, LLC.

Up to about 15% by weight, based on the weight of the binder, of a blocked polyisocyanate resin can be incorporated. A particularly preferred blocked polyisocyanate resin is DESMODUR BL-3175A available from Bayer Corporation. However, any blocked isocyanate resin, which is readily incorporated, may be used.

The coating composition includes a barium sulfate component in the range of about 10 to 50 parts by weight, preferably 20 to 40 parts by weight, based upon total binder weight. A particularly useful barium sulfate material is HUBERBRITE #1, available from J. M. Huber Corporation.

The barium sulfate component is generally introduced into the coating composition by first forming a mill base with any of the aforementioned binders or with another polymer that is compatible with the binder or with a dispersing agent by conventional techniques such as sand grinding, ball milling, attritor grinding or two roll milling. The mill base is blended with the other constituents used to form the coating composition.

Catalysts can be added to aid in curing coating composition, such as paratoluene sulfonic acid, dodecyl benzene sulfonic acid, dinonyl naphthalene disulfonic acid and the like. These catalysts can be blocked with agents such as dimethylethanolamine, aminomethyl propanol, dimethyloxazolidine and the like.

Any of the conventional solvents or blends of solvents can be used provided that the selection of solvent is such that the binder constituents are compatible and give a high quality coating. The following are examples of solvents that can be used: methanol, n-butanol, methyl isobutyl ketone, diisobutyl ketone, methyl ethyl ketone, methyl amyl ketone, toluene, xylene, acetone, ethylene glycol monobutyl ether acetate, n-butyl acetate, t-butyl acetate, n-propyl propionate, n-butyl propionate, n-propyl acetate, as well as other ester, ethers, ketone, aliphatic and aromatic hydrocarbon solvents that are conventionally used.

An oleophillic zircoaluminate coupling agent can be added to the coating composition in the range from about 0.1–10% by weight, preferably from about 1–5% by weight, based on the weight of total binder. Some examples of suitable oleophillic zircoaluminate coupling agents which can be used are disclosed in U.S. Pat. No. 5,468,791, as well as any other commercially available oleophillic zircoaluminate agent.

Pigments and/or fillers can be used in the coating composition. Typical pigments/fillers that can be used are talc, kaolin, graphite, hydrophobic silica, aluminum silicate, magnesium silicate, calcium carbohate, clay, carbonates, silicates, metallic oxides such as titanium dioxide, micronized titanium dioxide, iron oxide, zinc oxide; carbon black, zinc chromate, and the like. Organic colored pigments such as azo pigments, phthalocyanine pigments, quinacridone or pyrrolopyrrole pigments, and the like, can be used as well. These pigments/fillers generally are introduced in the form of a mill base with any of the aforementioned binders or with another polymer that is compatible with the binder or with a dispersing agent by conventional techniques such as sand grinding, ball milling, attritor grinding or two roll milling.

A coating composition based upon the present invention may contain an organically modified clay filler component.

A particularly useful modified clay filler is SCPX 2578, an alkyl quaternary ammonium clay, from Southern Clay Products, Inc.

To improve weatherability especially of a finish produced by the coating composition, an ultraviolet light stabilizer or a combination of ultraviolet light stabilizers can be added in the amount of about 0.1–10% by weight, based on the total weight of the binder. Such stabilizers include ultraviolet light absorbers, screeners, quenchers, and specific hindered amine light stabilizers. Also, an antioxidant can be added, in the about 0.1–5% by weight, based on the total weight of the binder. Typical ultraviolet light stabilizers that are useful include benzophenones, triazoles, triazines, benzoates, hindered amines and mixtures thereof.

The coating composition may also include other conventional formulation additives such as flow control agents, for example, such as RESIFLOW® S (polybutylacrylate), BYK® 320 and 325 (high molecular weight polyacrylates).

Figure 1:
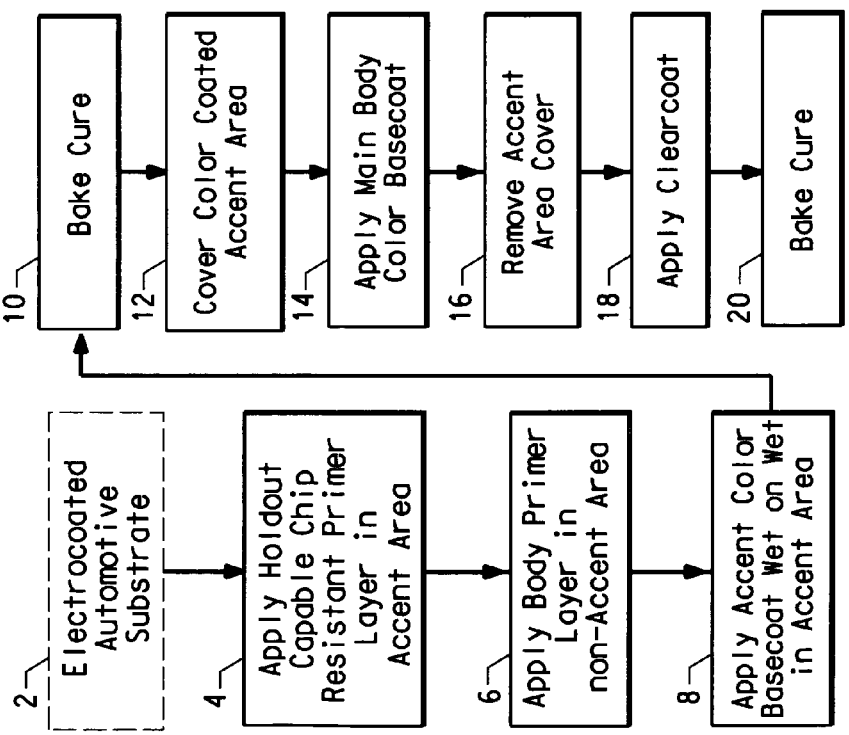
FIG. 1 is a general flow diagram of a two-tone coating scenario illustrating a use of an embodiment of the present invention.

The coating composition of the present invention is particularly useful when utilized in coating processes that provide multiple colored two-tone chip resistant finishes. FIG. 1 illustrates the use of an embodiment of the present invention in such a process. This process enables a two-tone finish utilizing a three wet coat integrated first stage, which is cured, followed by a second stage in which a colored basecoat and clearcoat are applied as a composite and cured. This finished substrate also has excellent chip resistance, as well as adhesion, intercoat adhesion, appearance, and other desired film properties.

Referring to FIG. 1, in step 2, an electrocoated vehicle substrate enters a two-tone coating scenario, wherein a holdout capable chip resistant curable coating composition is applied to an accent area of the vehicle substrate, step 4. Subsequently, in step 6, a second curable primer surfacer coating is then applied to the non-accent area, and in step 8 an accent color basecoat coating is applied to the aforementioned holdout capable chip resistant curable coating layer. The above wet-on-wet accent area layers, as well as the primed non-accent areas are then cured in step 10, at an effective time and temperature combination.

Referring once again to FIG. 1, after curing, in step 12 the color coated accent area is covered with a protective membrane and secured in place. The main body color basecoat is then applied to the vehicle substrate per step 14. The color coated accent area is then uncovered in step 16, a clearcoat is applied to the entire outer substrate of the vehicle per step 18, and the composite coating is cured in step 20.

In order to illustrate the advantage of the present invention over the conventional technique to achieve a chip resistant two-tone finish, refer to FIG. 2. As FIG. 2 indicates, a lower body chip resistant primer is applied over an electrocoated vehicle substrate in steps 22 and 24. Then a primer surfacer is applied to the entire substrate per step 26, and the chip resistant and primer layers are cured, step 28. In steps 30 and 32, a main color basecoat is applied to the non-accent area of the vehicle substrate, and clearcoat is then applied. The layers are then bake cured and covering with a protective membrane, per steps 34 and 36. An accent color basecoat is then applied to the accent area of the vehicle substrate, and clearcoated in accordance with steps 38 and 40. Finally, the accent color basecoat/clearcoat finish is bake cured, and the protective membrane removed, steps 42 and 44.

In summary, the conventional two-tone method consists of a total of 6 coating steps and 3 bake curing steps. In the first scenario, a two-tone chip resistant finish is achieved in 5 coating steps and 2 bake-curing steps. In yet another process, the finish is achieved in 4 coating steps and 2 bake-curing steps.

FIG. 3 is a graphic representation which further illustrates the use of the embodiment of the present invention, as described in FIG. 1, to produce a two-tone finish utilizing a three wet coat integrated first stage.

Referring to FIG. 3 (which uses the same reference numerals as used in FIG. 1), an electrocoated vehicle substrate enters a primer-coating booth, step 2, wherein a holdout capable chip resistant curable coating composition is applied to an accent area of the vehicle substrate, step 4. Then a second curable primer surfacer coating is then applied to the non-accent area in step 6. In step 8 an accent color basecoat coating is applied over the previously applied capable chip resistant curable coating layer. The above wet-on-wet-on wet layers are cured in step 10.

As FIG. 3 further illustrates, after curing, in step 12 the color coated accent area is covered with a protective membrane and secured in place. The main body color basecoat is then applied to the vehicle substrate per step 14, and the protective membrane removed, step 16. A clearcoat is then applied to the entire outer substrate of the vehicle (not shown in FIG. 3) and the composite coating is baked cured, step 20.

In an alternative method of the present invention, the aforementioned holdout capable chip resistant curable coating composition can be also used as the main body primer surfacer. Referring again to FIG. 3, the primer would be applied to the entire vehicle, combining steps 4 and 6. This scenario may be considered a wet-on-wet application method.

The nature of the clearcoat, basecoat, or primer surfacer composition used in conjunction with a coating composition based on the present invention is in no way critical. Any of a wide variety of commercially available automotive clearcoats, basecoat, or primer surfacer compositions may be employed in the present invention, including standard solvent borne, waterborne or powdered based systems. High solids solvent borne clearcoats, basecoats, and primer surfacers which have low VOC (volatile organic content) and meet current pollution regulations are more commonly employed. Typically useful solventborne coatings include but are not limited to 2K (two-component) systems of polyol polymers crosslinked with isocyanate and 1K systems of acrylic polyol crosslinked with melamine or 1K acrylosilane systems in combination with polyol and melamine. Epoxy acid systems can also be used. Such finishes provide automobiles and trucks with a mirror-like exterior finish having an attractive aesthetic appearance, including high gloss and DOI (distinctness of image). Suitable 1K solvent borne acrylosilane clearcoat systems that can be used are disclosed in U.S. Pat. No. 5,162,426, hereby incorporated by reference. Suitable 1K solvent borne acrylic/melamine clearcoat systems are disclosed in U.S. Pat. No. 4,591,533, hereby incorporated by reference. Also, 1K waterborne basecoats may be employed, and typically provide the same properties as solventborne basecoats. Any conventional waterborne base coats can be applied. Typically these are aqueous dispersions of an acrylic polymer and an alkylated melamine formaldehyde crosslinking agent. Useful compositions are taught in Nickle and Werner U.S. Pat. No. 5,314,945 issued May 24, 1994, which is hereby incorporated by reference.

The flash times between wet coats and bake curing time and temperatures will be readily apparent to those of skill in the art, and may be controlled by the specific coating chemistry or formulations. Generally though, flash times between uncured wet coats can range from about 15 seconds to 10 minutes, bake curing temperatures can range from about 100° C. to 160° C., and cure times can range from about 15 to 45 minutes.

The thickness of the cured composite two-tone finish is generally from about 50 to 275 µm (2 to 12 mils) and preferably about 100 to 200 µm (4 to 8 mils). The primers, basecoats, and clearcoat are preferably applied and cured to have thicknesses from about 10 to 50 μm (0.4 to 2.0 mils), about 10 to 50 μm (0.4 to 2.0 mils), and about 25 to 75 μm (1.0 to 3.0 mils), respectively.

EXAMPLES

The invention is further illustrated in the following non-limiting examples. All parts and percentages in the examples are on a weight basis unless otherwise indicated. All molecular weights disclosed herein are determined by GPC using a polystyrene standard.

The following abbreviations are used in the examples:
AD-adipic acid
PA-phthalic anhydride
NPG-neopentyl glycol
TMP-trimethylol propane
1,6 HDO-1,6 hexane diol
IPA-isophthalic acid
DDDA-1,12 dodecanedioic acid.

Example 1

A chip resistant primer composition with holdout capability was prepared by blending together the following ingredients in a suitable mixing vessel in the order shown:

| Ingredients | Parts by Weight |
|---|---|
| Low Tg polyester resin solution[1] | 18.3 |
| High Tg polyester resin solution[2] | 11.4 |
| Fully alkylated monomeric melamine[3] formaldehyde resin | 7.9 |
| Oleophillic zircoaluminate solution[4] | 1.0 |
| Polyacrylic Flow Additive[5] | 0.1 |
| White pigment dispersion[6] | 18.0 |
| Carbon black pigment dispersion[7] | 0.2 |
| Organic sulfonic blocked acid catalyst[8] solution | 1.0 |
| Amorphous silica dispersion[9] | 4.0 |
| Barium sulfate dispersion[10] | 25.3 |
| Magnesium silicate dispersion[11] | 3.6 |
| n-Butyl acetate | 9.2 |
| Total | 100.0 |

Table Footnotes
[1]80% solids of a polyester of NPG/TMP/1,6-HDO/IPA/AD/DDDA/PA in a weight ratio of 22.5/14.4/6.7/11.8/13.9/22.8/7.9 having a number average molecular weight of 1200 to 2000, a hydroxyl no. of 120 to 160 and an acid no. of 2 to 5 in n-butanol
[2]75% solids of a polyester of TMP/NPG/AD/PA/IPA in a weight ratio of 9.9/36.6/12.7/26.4/14.4 having a number average molecular weight of 1500 to 2000, a hydroxyl no. of 120 to 160 and an acid no. of 10 to 15 in methyl iso-butyl ketone
[3]Resimene 755 ® from UCB Chemicals Corp.
[4]MANCHEM FPM from FEDCHEM Inc.
[5]RESIFLOW ® from ESTRON, Inc.
[6]69% titanium dioxide pigment dispersed in an acrylic resin solution and n-propyl propionate solvent
[7]18% carbon black pigment dispersed in an acrylic resin solution and n-butyl propionate solvent
[8]45% solution of 1:1 molar ratio of 2-amino methyl propanol and dodecyl benzyl sulfonic acid in n-butanol
[9]9% AEROSIL ® R-805 fumed silica from DEGUSSA, Inc dispersed in an acrylic resin solution and solvesso 100/n-butanol solvent blend
[10]64% HUBERBRITE #1 barium sulfate pigment from J. M. HUBER CORPORATION dispersed in a polyester resin solution and solvesso 100 solvent
[11]28% MISTRON MONOMIX magnesium silicate pigment from LUZENAC AMERICA, Inc. dispersed in an acrylic resin solution and an isobutyl alcohol/butyl cellosolve acetate solvent blend The resulting primer coating composition had a theoretical % weight solids content of 71% and a viscosity of 50 seconds as measured with #4 Ford cup at 25° C. The primer was then reduced to spray viscosity to 28 seconds #4 Ford cup at 25° C. with solvesso 150 solvent.

In order to demonstrate acceptable popping, sagging, and mudcracking resistance, as well as holdout capability, the above primer was electrostatically sprayed to form primer wedges (13–63 μm) over 12×18 inch E-coated bent panel. The wet coating was then flashed for 30 seconds at room temperature. A conventional solventborne pigmented basecoat and pigmented primer were then sprayed wet-on-wet-on-wet at a film build of 13–25 μm over the above prepared primer. The composite was then flashed for 3 minutes and bake cured for 30 minutes at 140° C. Acceptable pop, sag, and mudcrack resistance, as well as holdout capability, were observed.

Chip resistance was tested and compared with the conventional combination of a primer surfacer/lower body chip resistant primer composite. The primer coating of above example 1 was spray applied onto a phosphated steel panel coated, with a cured cathodic epoxy resin based electrodeposition primer. The primed panel was flashed for about 5 minutes and baked for 30 minutes at 140° C. Film thickness of the primer surface was about 25–30 μm. The primed panel was then topcoated with a commercially available automobile beige colored pigmented solventborne basecoat with about 20 to 30 μm cured film build, and 50 to 65 μm of an acrylosilane-melamine based clear coating composition, available as Gen® IVES from E.I. DuPont de Nemours and Co. The topcoat was flashed for 10 minutes and bake cured for 30 minutes at 140° C. Chip resistance was tested per ASTM SAE J400 standards. Good chip resistance was observed, and was equivalent to the conventional combination of a primer surfacer/lower body chip resistant primer composite.

Various other modifications, alterations, additions or substitutions to the components of this invention will be apparent to those skilled in the art without departing from the spirit and scope of this invention. This invention is not limited by the illustrative embodiments set forth herein, but rather is defined by the following claims.

What is claimed is:

1. A curable coating composition useful in providing a chip resistant two-tone finish comprising:
    (a) a blend of hydroxyl-functional polyester resins, each of said resins having an average hydroxyl functionality of at least 2.1, a hydroxyl number from about 75 to 400 mg KOH/g, a number average molecular weight from about 1,000 to 10,000, and an acid number from about 1 to 30, wherein said blend comprises at least one hydroxyl-functional polyester resin having a glass transition temperature of greater than −15° C. and at least one hydroxyl-functional polyester resin having a glass transition temperature of equal or less than −15° C.;
    (b) a curing agent; and,
    (c) a barium sulfate component included in an amount from about 10 to 50 parts by weight, based upon total weight of binder solids;
wherein said curable coating composition has holdout capable characteristics with a basecoat applied over said curable coating in a wet on wet manner.

2. The coating composition of claim 1 wherein said blend consists of a first hydroxyl-functional polyester resin having a glass transition temperature greater than −15° C., and a second hydroxyl-functional polyester resin having a glass transition temperature equal or less than −15° C.

3. The coating composition of claim 2 wherein said first hydroxyl-functional polyester resin has a glass transition temperature from about 40 to −15° C., and a second hydroxyl-functional polyester resin has a glass transition temperature from about −15 to −60° C.

4. The coating composition of claim 3 wherein said first hydroxyl-functional polyester resin has a glass transition temperature from about 10 to −10° C., and a second hydroxyl-functional polyester resin has a glass transition temperature from about −20 to −40° C.

5. The coating composition of claim 1 wherein each of said hydroxyl-functional polyester resins comprises a tri- or higher-functional poly-alcohol which is selected from the group consisting of 1,1,1-trimethylol propane, 1,1,1-trimethylol ethane, 1,2,3- trimethylol propane, and pentaerythritol.

6. The coating composition of claim 1 wherein each of said hydroxyl-functional polyester resins has an average hydroxyl functionality from about 2.2 to 4.8.

7. The coating composition of claim 6 wherein each of said hydroxyl-functional polyester resins has an average hydroxyl functionality from about 2.5 to 3.0.

8. The coating composition of claim 1 wherein each of said hydroxyl-functional polyester resins has a number average molecular weight from about 1,000 to 5,000.

9. The coating composition of claim 1 wherein each of said hydroxyl-functional polyester resins has a hydroxyl number from about 100 to 250 mg KOH/g.

10. The coating composition of claim 1 wherein said barium sulfate component comprises from about 20 to 40 parts by weight based on the total weight of binder solids.

11. The coating composition of claim 10 wherein said barium sulfate component comprises from about 28 to 40 parts by weight based on the total weight of binder solids.

12. The coating composition of claim 1 wherein said curing agent is a melamine formaldehyde resin comprising a monomeric melamine, a polymeric melamine, or any mixture thereof.

13. The coating composition of claim 12 wherein said melamine formaldehyde resin comprises from about 10 percent to 50 percent by weight, based on the total weight of binder solids.

14. The coating composition of claim 13, wherein said melamine resin comprises from about 15 percent to 40 percent by weight, based on the total weight of binder solids.

15. The coating composition of claim 14 wherein said melamine resin comprises from about 20 percent to 35 percent by weight, based on the total weight of binder solids.

16. The coating composition of claim 1 wherein said curing agent is a blocked or unblocked polyisocyanate resin, or any mixture thereof.

17. The coating composition of claim 16 wherein said polyisocyanate comprises one or more trimers selected from the group consisting of hexamethylene diisocyanate, isophorone diisocyanate, meta-tetramethylxylylene diisocyanate, and a combination thereof.

18. The coating composition of claims 1 further comprising a flow-modifying agent.

19. The coating composition of claim 1 further comprising an oleophillic zircoaluminate coupling agent.

20. The coating composition of claim 1 further comprising a flow modifying resin.

21. The coating composition of claim 1 further comprising magnesium silicate filler component.

22. The coating composition of claim 21, wherein said magnesium silicate filler comprises from about 1% to 5% parts by weight, based on the total weight of binder solids.

23. The coating composition of claim 1 further comprising a pigment component.

24. The coating composition of claim 1 further comprising an organically modified clay filler component.

25. The coating composition of claim 1 further comprising 0.1 to 2.0% by weight, based on the total weight of the binder, of blocked acid catalyst.

26. The coating composition of claim 25 wherein said blocked acid catalyst comprises an organic sulfonic acid blocked with a hydroxyl functional alkyl amine.

27. The coating composition of claim 1 further comprising 0.1% to 10% by on the total weight of binder solids, of hindered amine stabilizers and ultraviolet light absorbers.

28. The coating composition of claim 1, wherein each of said hydroxyl-functional polyester resins is the esterification product of an alkylene glycol, a triol, a polyol, and a dicarboxylic acid or anhydride or an ester of a dicarboxylic acid.

* * * * *